United States Patent [19]

Seidel

[11] Patent Number: 4,699,410
[45] Date of Patent: Oct. 13, 1987

[54] SWIVEL CONNECTOR FOR HOISTS AND THE LIKE

[76] Inventor: Richard E. Seidel, 408 E. North St., Box 25, Little Chute, Wis. 54140

[21] Appl. No.: 901,279

[22] Filed: Aug. 28, 1986

[51] Int. Cl.[4] .................. B23B 43/00; F16G 15/08
[52] U.S. Cl. ............................ 294/1.1; 403/119; 403/164; 410/101; 410/85; 24/115 K; 248/499; 248/500
[58] Field of Search .............. 294/1.1, 74, 82.11; 403/119, 164, 152; 410/101, 113, 112, 85, 114; 24/115 K, 68 CD; 248/499, 500

[56] References Cited

U.S. PATENT DOCUMENTS

| | | | |
|---|---|---|---|
| 2,748,646 | 6/1956 | Harold et al. | 24/115 K |
| 3,297,293 | 1/1967 | Andrews et al. | 24/115 K |
| 3,371,951 | 3/1968 | Bryant | 294/1.1 |
| 3,628,820 | 12/1971 | Blatt | 294/1.1 |
| 3,680,906 | 8/1972 | Neumeier | 294/89 |
| 3,905,633 | 9/1975 | Larson | 294/1.1 |
| 4,074,519 | 2/1978 | Garrett | 403/164 |
| 4,431,352 | 2/1984 | Andrews | 410/101 |
| 4,558,979 | 12/1985 | Andrews | 248/499 |
| 4,641,986 | 2/1987 | Tsui et al. | 403/164 |

Primary Examiner—James B. Marbert
Attorney, Agent, or Firm—Andrus, Sceales, Starke & Sawall

[57] ABSTRACT

A swivel connector includes a ring (1) which is assembleable into a slot (5) in a hoist member (2), with the slot having an open end forming an enlarged bifurcated recess portion (8). The ring and hoist are assembled to an annular housing (9) and a first nut (14) is positioned for sliding movement and relative rotation within the housing and is threaded onto the slotted end of the hoist member. A plug (16) is positioned within the bifurcated hoist slot recess end and a second nut (17) having a threaded axial opening is secured within the housing. A threaded shaft (22) is provided and which is threadably disposed within the second nut opening and in relatively loose engagement with the plug. The shaft extends outwardly for securement to the load or the like. During swiveling use, the ring (1), hoist (2), plug (22) and first nut (14) turn together, with the other elements remaining fixed.

8 Claims, 6 Drawing Figures

U.S. Patent  Oct. 13, 1987  Sheet 1 of 2  4,699,410
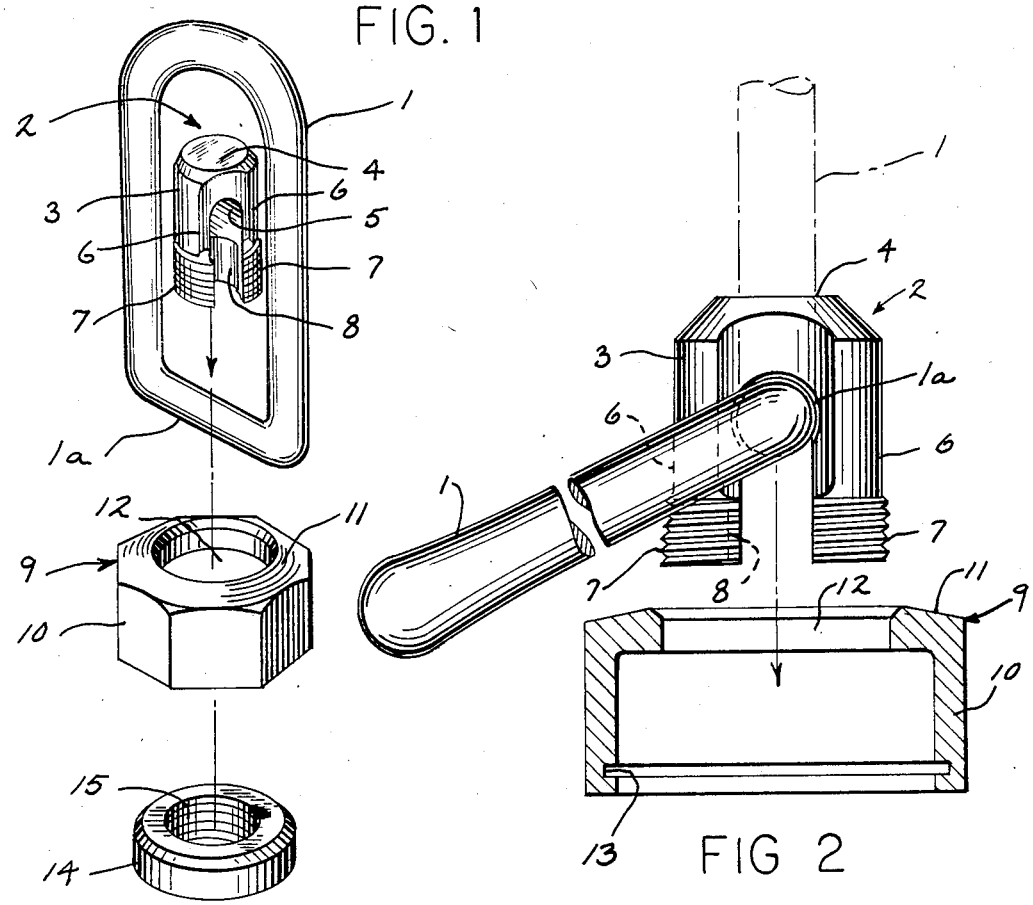
FIG. 1
FIG 2
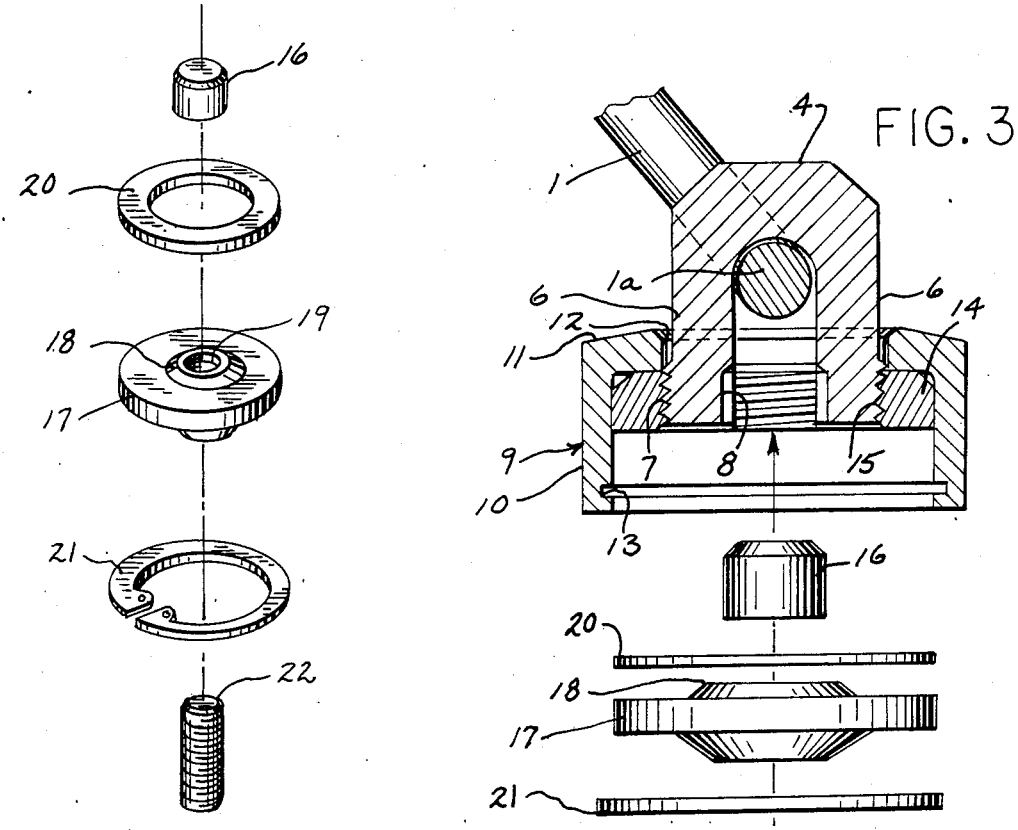
FIG. 3

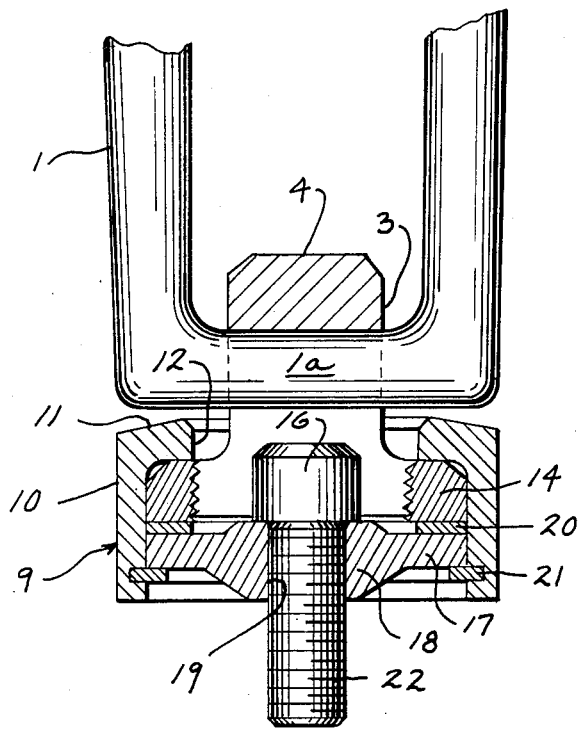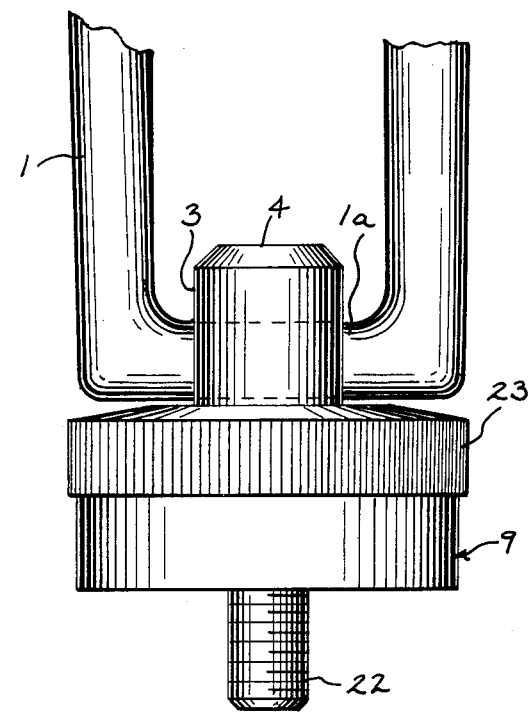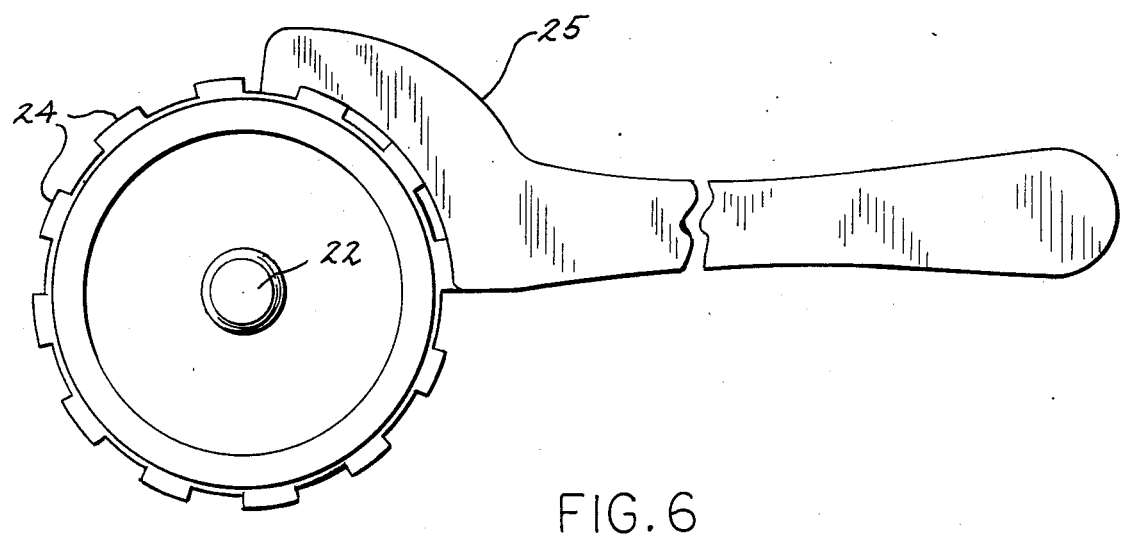

SWIVEL CONNECTOR FOR HOISTS AND THE LIKE

U.S. PRIOR ART OF INTEREST

| U.S. Pat. No. | Inventor | Issue Date |
| --- | --- | --- |
| 2,748,646 | Harold et al | June 5, 1956 |
| 3,297,293 | Andrews et al | January 10, 1967 |
| 3,371,951 | Bryant | March 5, 1968 |
| 3,628,820 | Blatt | December 21, 1971 |
| 3,680,906 | Neumeier | August 1, 1972 |
| 3,905,633 | Larson | September 16, 1975 |
| 4,074,519 | Garrett | February 21, 1978 |
| 4,431,352 | Andrews | February 14, 1984 |

BACKGROUND AND SUMMARY OF THE INVENTION

This invention relates to a swivel connector for hoists and the like, and more particularly to a swivel connector for connecting two elements such as a lifting device and a load to be lifted, although other elements could be connected by the device as well.

The device of the invention is believed by the present inventor to be an improvement over devices such as shown in the above-identified U.S. patents which disclose various known connectors, especially in simplicity and ease of assembly of the ring and hoist.

In accordance with the various aspects of the invention, a ring is assembleable into a slot in a hoist member, with the slot having an open end forming an enlarged bifurcated recess portion. The ring and hoist are assembled to an annular housing and a first nut is positioned for axial sliding movement and relative rotation within the housing and is threaded onto the slotted end of the hoist member. A plug is positioned within the bifurcated hoist slot recess and a second nut having a threaded axial opening is secured within the housing. A threaded shaft is provided and which is threadably disposed within the second nut opening and in relatively loose engagement with the plug. The shaft extends outwardly for securement to a load or the like. During swiveling use, the ring, hoist, plug and first nut turn together, with the other elements remaining fixed.

BRIEF DESCRIPTION OF THE DRAWINGS

The accompanying drawings illustrate the best mode presently contemplated by the inventor for carrying out the invention.

In the drawings:

FIG. 1 is an exploded view of a swivel connector constructed in accordance with the various aspects of the invention;

FIG. 2 is a partially sectional view of the partially assembled ring, hoist and annular housing;

FIG. 3 is a partially sectional view showing further assembly of the device;

FIG. 4 is a partially sectional view of the completely assembled connector;

FIG. 5 is a side elevation of a slightly different embodiment of connector; and

FIG. 6 is a plan view of a further embodiment of connector, with a spanner wrench connected thereto.

DESCRIPTION OF THE PREFERRED EMBODIMENT

As best shown in FIG. 1 of the drawings, the connector of the invention includes a ring 1, which may be of forged metal or the like, and the straight end portion 1a of which may be attached to any desirable external element, not shown. A hoist member 2 is adapted for connection to ring 1 and comprises an annular body 3 having a closed end 4, with the opposite end being provided with an axially extending slot 5 which opens outwardly and separates body 3 into opposed leg portions 6. The slot ends of legs 6 are threaded externally, as at 7. Furthermore, the outer terminus end of slot 5 is formed with an enlarged bifurcated recess 8, for purposes to be described.

Ring 1 and hoist member 2 are adpated to be mounted to an annular housing 9 having a side wall 10, a top 11 defining a central opening 12, an annular recess 13 in the inner face of side wall 10 remote from top 11, and a generally open bottom. In addition, a first nut 14 is provided and has an external diameter approximating that of the internal diameter of housing side wall 10, but with a slightly loose fit, such as 0.0001 inch tolerance. Nut 14 has an internal axial opening having threads, as at 15, for engagement with threads 7 of hoist legs 6.

A plug 16 is adapted to be slideably mounted within bifurcated recess 8, as will be described.

Furthermore, a second nut 17 is adapted to be mounted within housing 9 and, like nut 14, has an external diameter approximating that of the internal diameter of housing side wall 10, with a similar slight loose fit. Second nut 17 has a thickened central portion 18 for strengthening purposes to help bear any axial load, and also has an internal axial opening having threads, as at 19. This latter opening is of smaller diameter than the opening in first nut 14, and is also of smaller diameter than plug 16.

Second nut 17 is adapted to be spaced from first nut 14 within housing 9, as by a spacer ring 20. In addition, nut 17 is adapted to be locked in position by an expandable interrupted split ring 21 which snaps outwardly into housing wall recess 13, thus holding the assembly together.

For purposes of engagement with an external element such as a load (not shown), a threaded shaft 22 of reduced diameter is provided and which is adapted to be threaded axially into threads 19 of second nut 17 for engagement with plug 16. The engagement should have sufficient tolerance and be sufficiently loose (such as 0.0003 inch) to permit relative coaxial rotation between plug 16 and shaft 22.

In assembling the swivel connector, and referring especially to FIGS. 2-4, straight portion 1a of ring 1 is slid into hoist slot 5 to the inner slot end. The outer slotted terminal end portion of hoist member 2 is then passed through housing opening 12 so that it is disposed therewithin. First, nut 14 is slid into housing 9 and threaded onto the lower hoist end. Plug 16 is then slid into bifurcated recess 8 in hoist member 2, so that plug 16 and bifurcated recess 8 are disposed radially inwardly of first nut 14. Spacer ring 20 is then brought into engagement with the bottom of first nut 14, second nut 17 is slid into housing 9 so that the nut engages and supports plug 16, and split ring 21 is installed to cooperate with top 11 to hold the elements against axial movement within the housing. Finally, shaft 22 is threaded into nut 17 until it loosely bears against plug 16.

Assuming that ring 1 is mounted to a turnable external element, and the outer end of shaft 16 which extends beyond housing 9 is mounted to a relatively fixed external element, when there is turning force applied to the turnable element: ring 1, hoist member 2, first nut 14 and plug 16 will all turn together, for up to 360° while the other elements will remain fixed. During such swiveling, shaft 22 will rotate relative to and coaxially on the bottom of plug 16. If the external elements to which the connector is attached are reversed as to movement, the reverse occurs with the connector also.

During assembly, disassembly and use, it may be desirable to manually rotate housing 9. For this purpose, housing 9 is shown as having an eight-sided hex-shaped side wall 10 in FIG. 1. Alternately, housing side wall 10 may be knurled as at 23 in FIG. 5, for engagement by a suitable tool; or it may be provided with enlarged gears 24 for engagement by a spanner wrench 25 as shown in FIG. 6.

The concepts of the present invention are believed to provide a simplified swivel connector which is relatively simple in construction, as well as being easy to manufacture and assemble.

Various modes of carrying out the invention are contemplated as being within the scope of the following claims particularly pointing out and distinctly claiming the subject matter which is regarded as to the invention.

I claim:

1. A swivel connector for hoists and the like comprising, in combination:
    (a) a hoist ring (1) adapted for connection to an external element,
    (b) a hoist member (2) having an axial slot (5) receiving said ring, said slot opening axially outwardly of one end of said hoist member and forming
        (1) a pair of externally threaded hoist legs (6),
        (2) and a bifurcated enlarged recess (8) at the outer slot terminus,
    (c) an annular housing (9) having a side wall (10), an annular top (11) forming an axial opening (12) therein, and having a generally open bottom,
    (d) a first nut (14) slideably disposed within said housing (9) and defining a first internal threaded axial opening (15), and with said first nut being threaded onto said hoist legs (6),
    (e) a plug (16) removably disposed within said bifurcated recess (8),
    (f) a second nut (17) slideably disposed within said housing (9) axially outwardly of said plug and defining a second internal threaded axial opening (19),
    (g) means (21) for holding said first and second nuts (14, 17) within said housing (9),
    (h) and a shaft (22) threaded into said second opening (19) and loosely engaging said plug (16);
    (i) said shaft having an outwardly extending portion adapted for connection to an external element.

2. The swivel connector of claim 1 in which: said hoist member (2) is passable through said housing opening (12) for assembly of said hoist member (2) to said housing (9).

3. The swivel connector of claim 1 in which: said shaft (22) is rotatable coaxially relative to said plug (16) during swiveling of said connector.

4. The swivel connector of claim 1 in which: said plug (16) and bifurcated recess (8) are disposed radially inwardly of said first nut (14).

5. The swivel connector of claim 4 in which: said plug (16) engages and is supported by said second nut (17).

6. The swivel connector of claim 5 in which: said first opening (15) in said first nut (14) is larger in diameter then said second opening (19) in said second nut (17).

7. The swivel connector of claim 6 in which: said second nut (17) has a thickened central portion (18) to enhance load carrying.

8. The swivel connector of claim 7 which includes: spacer means (20) disposed between said first and second nuts (14, 17).

* * * * *